Dec. 15, 1959  H. A. DUVALL ET AL  2,917,083
WIRING DUCT
Filed Oct. 22, 1952  2 Sheets-Sheet 1
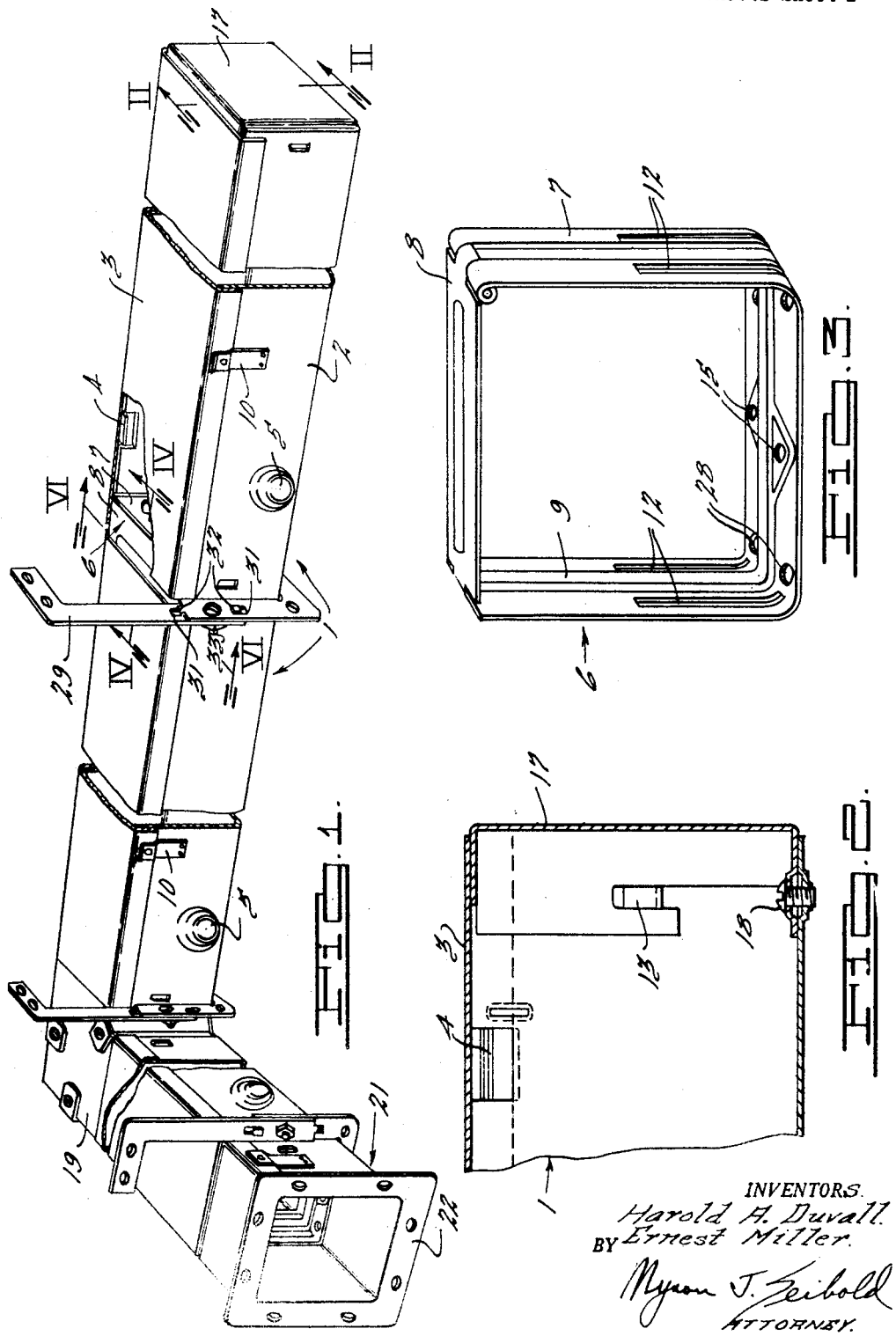
INVENTORS.
Harold A. Duvall.
BY Ernest Miller.
Myron J. Seibold
ATTORNEY.

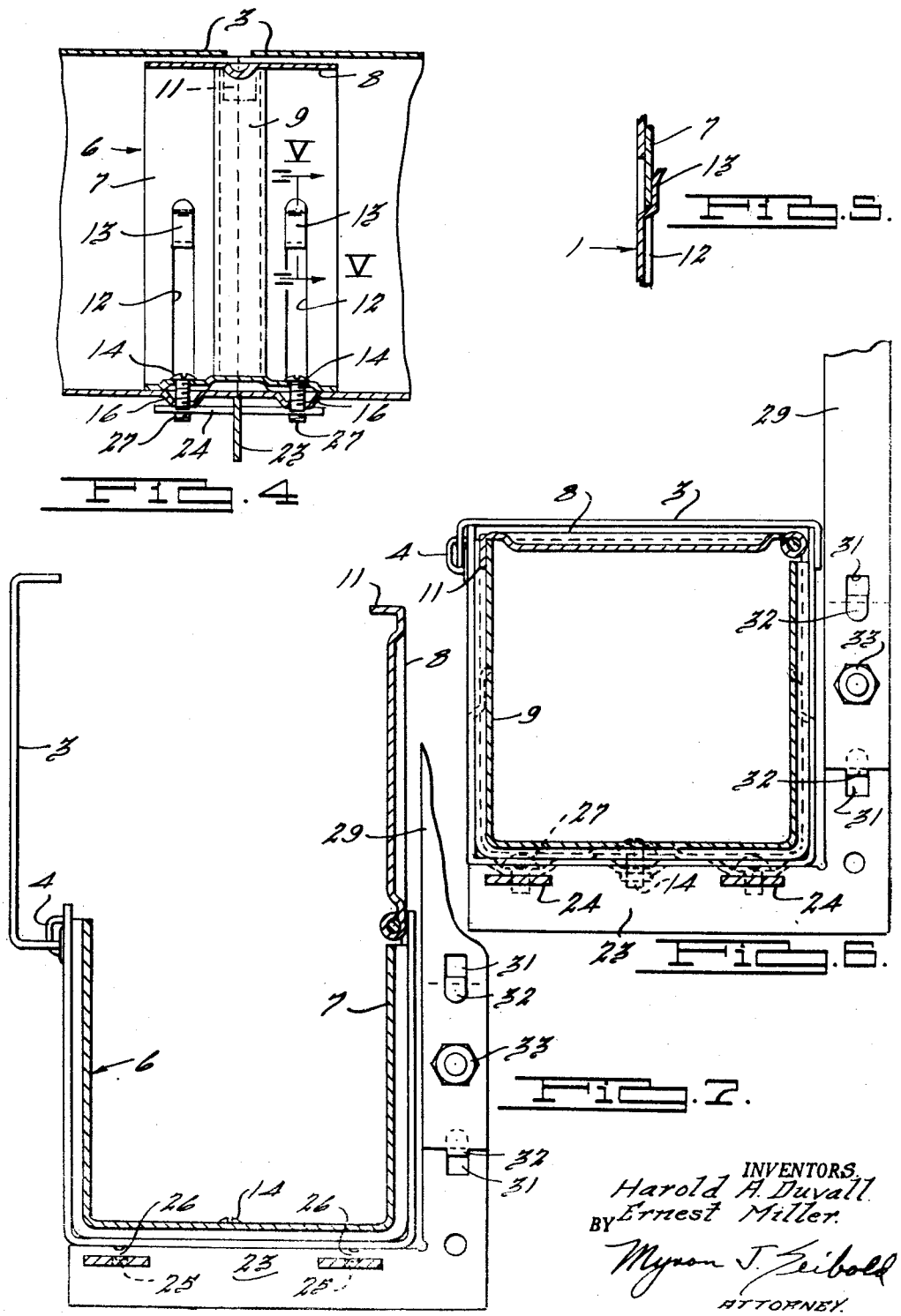

United States Patent Office 2,917,083
Patented Dec. 15, 1959

2,917,083

WIRING DUCT

Harold A. Duvall and Ernest Miller, Los Angeles, Calif., assignors to Square D Company, Detroit, Mich., a corporation of Michigan Application October 22, 1952, Serial No. 316,177

15 Claims. (Cl. 138—75)

This invention relates to a conduit system for electrical conductors made up of a plurality of sheet metal duct sections having openable covers and has for its object the provision of improved means for connecting and mounting the duct sections.

Another object of this invention is the provision of a conduit system for electrical conductors made up of a plurality of sheet metal duct sections in which the mounting and connecting means for the sections provides for complete access into the conduit system throughout its length so that wires and cables may be laid in the conduit without threading through junctions of the section.

Another object of the invention is the provision of a conduit system in accordance with the preceding object, providing for relatively rigid connection between the sections in which the connector is openable at the side corresponding to the openable side of the duct sections, the openable side interlocking with the connector and/or duct section to rigidify the system.

Another object of the invention is the provision of an electrical conduit system made up of sheet metal duct sections in which adjacent ends of sections are joined together by connectors slidably interlocking with side walls and maintained in rigid connecting engagement with a minimium of bolts.

Other objects and features of the invention will be readily apparent to those skilled in the art from the specification and appended drawings illustrating certain preferred embodiments in which:

Figure 1 is a perspective view of a conduit system according to the present invention.

Figure 2 is a partial longitudinal sectional view on the line II—II of Figure 1.

Figure 3 is a perspective view of a connector strap used to join adjacent ends of duct sections.

Figure 4 is a partial longitudinal sectional view on the line IV—IV of Figure 1.

Figure 5 is a detail sectional view on the line V—V of Figure 4.

Figure 6 is a transverse sectional view on the line VI—VI of Figure 1.

Figure 7 is a view similar to Figure 6 with the cover and adjacent connector side shown in open position to provide access to the interior of the conduit.

The conduit system shown in the drawing is made up of a plurality of duplicate sheet metal duct sections 1 formed with U-shaped body portions 2 having openable covers 3 mounted thereon by loop and slot hinge mountings 4 at one edge of the U-shaped body portion 2, the cover being latched in closed positon by a latch 10 carried by the leg of the body portion 2 opposite the hinge 4 and engaging the flange at the edge of the cover 3, as shown more particularly in Figure 1. The walls of the body portion 2 are provided with a multiplicity of knock-out portions 5 disposed along the length of the section in relatively close spacing to provide ready access for wires and cables into the interior of the duct.

The adjacent ends of the individual duct sections are joined by connector straps 6 shown in perspective in Figure 3 as comprising a U-shaped sheet metal strap 7 having a closing leg 8 hingedly mounted at one edge of the strap 7, with the hinge extending at right angles to the plane of the U and parallel to the walls of the strap. The central portion of the strap 7 is provided with a bead 9 which rigidifies the strap and also presents a smooth surface at the interior of the duct for engagement with wires within the duct. The end of the leg 8 opposite its hinge is provided with a tongue or locking member 11 which engages in the concave portion of the bead 9 to form the strap 7 and leg 8 into a substantially rigid rectangular structure.

The opposite legs of the U-shaped strap 7 are provided with pairs of slots 12 within which are received clip fingers or tongues 13 pressed from the side wall of the main body portion 2 of the duct section, as more particularly shown in Figures 4 and 5. At the upper ends of the slots 12, the strap 7 becomes interlockingly engaged with the ends of the juxtaposed duct sections since the side walls of the strap 7 are disposed between the interior side wall surfaces of the duct section body portions 2 and the opposed surfaces of the fingers or tongues 13. A pair of studs 14 having their shanks passing freely through the openings 15 in the bight wall of the strap 7 and threaded into extruded portions 16 in the bight walls of the duct body portions 2 serve to hold the connector strap in interlocking engagement with the side walls of the duct sections and also serve to connect the bight walls of the duct sections to the bight wall of connector strap.

The section of Figure 2 indicates closure of the right hand end of the conduit of Figure 1. Here, the pressed out finger 13 on the side wall of the duct section adjacent the end thereof interlocks with the side wall of the generally cup-shaped member 17 which is further connected and maintained in the interlocked position by means of a stud 18 threaded into the bight wall of the duct section.

A right angle bend corner section is shown on the drawing at 19, and it will be appreciated that any desired arrangement of junction boxes may be provided similar to those provided in connection with the conduit system illustrated in Patent No. 1,992,574 granted February 26, 1935, Figure 1 herein showing a left hand end section 21 having a flange 22 for connection to a duct system of the type illustrated in the patent.

To support the conduit system of the present invention, there may be provided an L-shaped mounting hanger 23 having loosely mounted in slots in the base leg thereof a pair of short plates 24 provided with central holes 25 therethrough into which upset portions 26 of the hanger 23 are received so as to mount the plates 24 loosely in the hanger leg for free movement relative thereto in several directions while being retained in assembled relation. To mount the duct system on the hangers 23 there are provided studs 27 whose heads engage the inner surfaces of the bight walls of the duct sections and whose shanks thread into openings adjacent the ends of the plates 24. The heads of the studs 27 pass freely through clearance holes 28 in the bight of the strap 7 and are readily accessible to a tool inserted through the clearance openings. Thus, the plates 24 and studs 27 serve to further connect the adjacent ends of duct sections independent of the connector strap.

The hanger 23 may be bolted directly to a supporting member by suitable bolts passing through the openings shown therein; but, as shown in the drawing, there is provided a second hanger member 29 also of L-shape and connected to the hanger 23 in inverted relation. The connecting legs of the hangers have openings 31 therethrough and the ends of the bracket legs are provided with hooks 32 passing through and engaging the adjacent edges of the openings 31 when the hangers are pulled apart after assembly into interlocking position where they are maintained by a bolt 33 passing therethrough. The other leg of the hanger member 29 may be connected to any desired support such as a ceiling or wall bracket.

A section junction of the conduit system of this invention is shown in normal closed position in Figure 4 with the ends of the duct sections rigidly connected together as a result of interlocking between the side walls of the strap and duct sections provided by the interlocking slots 12 and fingers 13 and the connecting of the bight walls by the studs 14. The covers 3 may be readily swung open on the hinges 4 in the manner shown in Figure 7 when the latches 10 are disengaged. The side 8 of the strap 7 may then be swung open about its hinge at the edge of the strap, rotating about an axis parallel to the axis of rotation of the cover 3 into the position also shown in Figure 7. In this position it is clear that the entire length of the duct is open to access and that wiring and cables may be directly laid therein without the necessity of threading through junction flanges as in the aforenoted Patent No. 1,992,574.

When the leg 8 is in closed position, as shown in Figure 6, the tongue 11 is received within the concave portion of the adjacent end of the bead 9 to interlock the leg 8 with the side of the strap 7 opposite its hinge to form a substantially rigid rectangular structure. With the tongue 11 between the side walls of both the strap and duct sections, the leg 8 thus serves to rigidify the duct and prevent spreading the collapse of the side walls thereof as well as providing a surface against which the edges of the covers 3 engage, thus preventing access into the duct interior through the space between the cover edges.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A conduit system for electrical conductors including a plurality of duplicate open end sheet metal duct sections, each of said sections having a substantially U-shaped trough body and a movable cover, connecting straps joining the adjacent ends of said duct sections, said straps having at least side and bottom walls conforming to the walls of the troughs, tongues pressed inwardly from the side walls of the troughs, slots in the side walls of the straps receiving said tongues, the strap side walls defining the ends of the slots being clamped between the tongues and the walls of the troughs as the straps and trough ends are slidably engaged, and means interconnecting the bottom walls of the straps and troughs.

2. A conduit system for electrical conductors including a plurality of duplicate open end sheet metal duct sections, each of said sections having a substantially U-shaped trough body and a movable cover, connecting straps joining the adjacent end of said duct sections, said straps having at least side and bottom walls conforming to the walls of the troughs, tongues pressed inwardly from the side walls of the troughs, slots in the side walls of the straps receiving said tongues, the strap side walls defining the ends of the slots being clamped between the tongues and the walls of the troughs as the straps and trough ends are slidably engaged, means interconnecting the bottom walls of the straps and troughs, top walls on the straps interconnecting the side walls of the straps to rigidify the duct sections, and means mounting said strap top walls for rotation about an axis parallel to the longitudinal axis of the duct sections to uncover the interior for full access.

3. A conduit system for electrical conductors including a plurality of duplicate open end sheet metal duct sections, each of said sections having a substantially U-shaped trough body with bight and side wall portions and a movable cover with the open side of the U unobstructed through the length of the section, substantially U-shaped connecting straps with bight and side wall portions joining the adjacent ends of duct sections, said strap and section side walls having complementary means thereon whereby said side walls of said strap slidably interlock with the side walls of said section as the straps are inserted into the troughs, and studs attaching the bight walls of the troughs to the adjacent walls of the straps, said straps having a cover adjacent to and normally disposed underneath the trough cover, said strap cover being hingedly mounted to one of said side walls of said strap for rotational movement about an axis parallel to the longitudinal axis of the sections to uncover the interiors of the sections for direct access throughout the length of the sections.

4. A conduit system for electrical conductors including a plurality of duplicate open end sheet metal duct sections, each of said sections having a substantially U-shaped trough body with bight and side wall portions and a movable cover with the open side of the U unobstructed throughout the length of the section, substantially U-shaped connecting straps having bight and side wall portions joining the adjacent ends of duct sections, said strap and section side walls having complementary means thereon whereby said side walls of said strap slidably interlock with the side walls of said sections as the straps are inserted into the troughs, and studs attaching the bight walls of the troughs to the bight walls of the straps, said straps having a cover adjacent to and normally disposed underneath the trough covers, said strap cover being hingedly mounted to one of said walls of said strap for rotational movement about an axis parallel to the longitudinal axis of the sections to uncover the interiors of the sections for direct access throughout the length of the system, said strap cover having means for overlapping with the side wall of the strap opposite to the strap cover hinge to rigidify the strap and prevent spreading of the trough.

5. A conduit system for electrical conductors including a plurality of duplicate open end sheet metal duct sections, each of said sections having a substantially U-shaped trough body and a movable trough cover with the open side of the U unobstructed through the length of the section, connecting straps joining the adjacent ends of duct section, said connecting straps also being substantially U-shaped and disposed within the ends of adjacent troughs with the walls of the straps connected to the walls of the trough, a cover wall hingedly mounting to the end of one wall of each of said U-shaped straps for rotation about an axis extending longitudinally of the duct sections, said straps cover adapted to be disposable beneath the edges of adjacent trough covers when said trough covers are closed, said strap cover walls being rotatable about said longitudinal axis when the trough covers are opened to uncover the interior of the sections for direct access throughout the length of the system, and means on said strap cover walls and opposite side walls whereby said cover overlaps with said side walls of said straps opposite to said strap cover hinge mounting to rigidify said straps and prevent spreading of said troughs.

6. A conduit system for electrical conductors including a plurality of duplicate open end sheet metal duct sections, each of said sections having a substantially U-shaped trough body and a trough cover with the open side of said U unobstructed throughout the length of the section, said trough cover being hingedly mounted to the end of one leg of said U for rotation about an axis extending longitudinally of the duct sections, connecting straps joining the adjacent ends of duct sections, said connecting straps also being substantially U-shaped and disposed within the ends of adjacent troughs with the legs of the straps connected to the legs of the troughs, cover walls hingedly mounted to the end of one leg of said U-shaped strap for rotation about an axis extending longitudinally of the duct sections, said strap cover having its hinge mounting at the opposite side of said trough from the hinge mounting of said trough cover and adapted to be disposed beneath the edges of adjacent trough covers when said trough covers are closed, said strap cover walls being rotatable about said longitudinal hinge axis when said trough covers are open to uncover the interior of the sections for direct access throughout the length of the system, and means on said strap cover walls adjacent to its free end for overlapping with the walls of said strap remote from its hinge mounting to rigidify the trough and prevent collapsing thereof.

7. A conduit system for electric conductors including a plurality of duplicate open end sheet metal duct sections, each of said sections having a substantially U-shaped trough body and a movable cover, connecting straps joining the adjacent ends of duct sections, said straps having at least side and bottom walls conforming to the walls of the troughs, tongues pressed inwardly from the side walls of the troughs, slots in the side walls of the straps receiving said tongues, the strap side walls defining the ends of the slots being clamped between the tongues and the walls of the troughs as the straps and trough ends are slidably engaged, means interconnecting the bottom walls of the straps and troughs, top walls on the straps interconnecting the side walls to rigidify the duct sections, and means mounting said top walls in releasable engagement with at least one of said side walls to permit opening movement of said top walls to uncover the interior for full access.

8. A conduit system for electrical conductors comprising a plurality of elongated sheet metal duct sections of substantially identical cross-section arranged in end-to-end relation, each of said duct sections comprising a pair of spaced side walls which are generally parallel to each other, a bottom wall extending between said side walls substantially normal thereto and a cover wall openable to provide access into the interior of said duct section, whereby, when said duct sections are in said end-to-end relation, the walls of one section are longitudinally aligned with the corresponding walls of the other section, a tongue adjacent each end of each duct section side wall, each of said tongues having a translating portion extending transversely of its associated side wall and a locking portion extending generally parallel to its associated side wall, a connector for joining the adjacent ends of adjacent pairs of said duct sections, said connector having spaced side walls and a bottom wall substantially conforming to said side and bottom walls, respectively, of said duct sections so as to be engageable with both of said duct sections in close telescoping relationship when said duct sections are in said end-to-end relation, cutout portions in said connector side walls complementary to said tongues, respectively, an edge portion of said connector side walls adjacent each cutout portion being receivable between said locking portion of each tongue associated therewith and the adjacent duct section side wall when said connector is in said close telescoping relationship with said duct sections, engagement of said tongues with their associated edge portions of said connector being operative to restrict relative movement of said duct sections with respect to said connector in directions transverse to and longitudinal of said duct section side walls, and means interconnecting at least one wall of each of said duct sections and said connector to further restrict relative movement of said duct sections with respect to said connector.

9. A conduit system in accordance with claim 8 characterized in that said section cover wall is rotatably secured to one of said section side walls and releasably engagable with the other of said section side walls.

10. A conduit system in accordance with claim 8 characterized in that said cutout portions consist of spaced slots complementary in width to the width of said tongues.

11. A conduit system in accordance with claim 10 characterized in that said slots are elongated with their longer axis disposed generally transversely of the longitudinal axis of said duct section when said connector is in telescoping relationship therewith.

12. A conduit system in accordance with claim 11 characterized in that said slots extend into said bottom wall of said connector.

13. A conduit system for electrical conductors comprising a plurality of elongated sheet metal duct sections of substantially identical cross-section arranged in end-to-end relation, each of said duct sections comprising a pair of spaced side walls which are generally parallel to each other, a bottom wall extending between said side walls substantially normal thereto and a cover wall openable to provide access into the interior of said duct section, whereby, when said duct sections are in said end-to-end relation, the walls of one section are longitudinally aligned with the corresponding walls of the other section, a tongue adjacent each end of each duct section side wall, each of said tongues having a translating portion extending transversely of its associated side wall and a locking portion extending generally parallel to its associated side wall, a connector for joining the adjacent ends of adjacent pairs of said duct sections, said connector having spaced side and bottom walls substantially conforming to said side and bottom walls, respectively, of said duct sections so as to be engageable with both of said duct sections in close telescoping relationship when said duct sections at one end are in said end-to-end relation, a closing leg rotatably secured at one end to one of said connector side walls and openable to provide access into the interior of said conduit system, cutout portions in said connector side walls complementary to said tongues, respectively, an edge portion of said connector side walls adjacent each cutout portion being receivable between said locking portion of each tongue associated therewith and the adjacent duct section side wall when said connector is in said close telescoping relationship with said duct sections, engagement of said tongues with their associated edge portions of said connector being operative to restrict relative movement of said duct sections with respect to said connector in directions transverse to and longitudinal of said duct section side walls, and means interconnecting at least one wall of each of said duct sections and said connector to further restrict relative movement of said duct sections with respect to said connector.

14. A conduit system in accordance with claim 13, characterized in that said closing leg of said connector has a locking member at the other end thereof that is releasably engageable with the other of said connector side walls to restrict relative movement between said connector side walls.

15. A conduit system in accordance with claim 13 characterized in that said closing leg of said connector is secured to said one of said connector side walls for rotation about an axis parallel to the longiudinal axis of said duct sections when said connector is in said telescoping relationship with said duct sections.

References Cited in the file of this patent

UNITED STATES PATENTS

| 1,992,574 | Jenkins | Feb. 26, 1935 |
| 2,286,118 | Sleeth | June 9, 1942 |
| 2,316,166 | Huguelet | Apr. 13, 1943 |
| 2,330,769 | Wichner | Sept. 28, 1943 |
| 2,353,121 | Adam et al. | July 11, 1944 |
| 2,355,845 | Blank | Aug. 15, 1944 |